United States Patent
Li Puma et al.

(10) Patent No.: US 8,233,854 B2
(45) Date of Patent: Jul. 31, 2012

(54) POLAR MODULATOR AND METHOD FOR GENERATING A POLAR-MODULATED SIGNAL

(75) Inventors: Giuseppe Li Puma, Bochum (DE); Michael Feltgen, Krefeld (DE)

(73) Assignee: Intel Mobile Communications GmbH, Neubiberg (DE)

( * ) Notice: Subject to any disclaimer, the term of this patent is extended or adjusted under 35 U.S.C. 154(b) by 524 days.

(21) Appl. No.: 12/434,510

(22) Filed: May 1, 2009

(65) Prior Publication Data
US 2009/0275359 A1  Nov. 5, 2009

(30) Foreign Application Priority Data
May 2, 2008  (DE) .......... 10 2008 021 876

(51) Int. Cl.
*H03C 1/06* (2006.01)
*H03C 3/06* (2006.01)
*H03L 7/093* (2006.01)
*H04L 27/00* (2006.01)

(52) U.S. Cl. ......... 455/118; 455/108; 332/145; 327/361
(58) Field of Classification Search .......... None
See application file for complete search history.

(56) References Cited

U.S. PATENT DOCUMENTS

| | | | |
|---|---|---|---|
| 7,095,819 B2* | 8/2006 | Bellaouar et al. | 375/376 |
| 7,289,005 B2* | 10/2007 | Puma | 332/145 |
| 7,579,922 B2* | 8/2009 | Jensen et al. | 332/128 |
| 7,979,038 B2* | 7/2011 | Mitani et al. | 455/112 |
| 2006/0197605 A1* | 9/2006 | Hirano et al. | 331/16 |
| 2009/0275358 A1* | 11/2009 | Feltgen et al. | 455/550.1 |
| 2009/0311972 A1* | 12/2009 | Husted et al. | 455/76 |

FOREIGN PATENT DOCUMENTS

| | | |
|---|---|---|
| DE | 60206795 T2 | 7/2006 |
| DE | 102005006162 B3 | 8/2006 |

OTHER PUBLICATIONS

German Office Action (parallel application) dated Apr. 23, 2009, Application 102008021876.6-31, 5 pgs.

* cited by examiner

*Primary Examiner* — Lincoln Donovan
*Assistant Examiner* — Terry L Englund
(74) *Attorney, Agent, or Firm* — Eschweiler & Associates, LLC

(57) ABSTRACT

A polar modulator for generating a polar-modulated signal based on amplitude information and phase information includes a phase-locked loop which is implemented to enable a setting of a frequency depending on a control value to obtain a phase-locked loop output signal. The polar modulator further includes a modulation means which is implemented to combine an amplitude modulation signal derived from the amplitude information with the phase-locked loop output signal to generate the polar-modulated signal. The polar modulator further includes a control value generator which is implemented to high-pass filter an amplitude signal derived from the amplitude information, to obtain a high-pass filtered amplitude signal, wherein the control value generator is implemented to combine the high-pass filtered amplitude signal with a phase signal based on the phase information to generate the control value signal representing the control value.

26 Claims, 13 Drawing Sheets

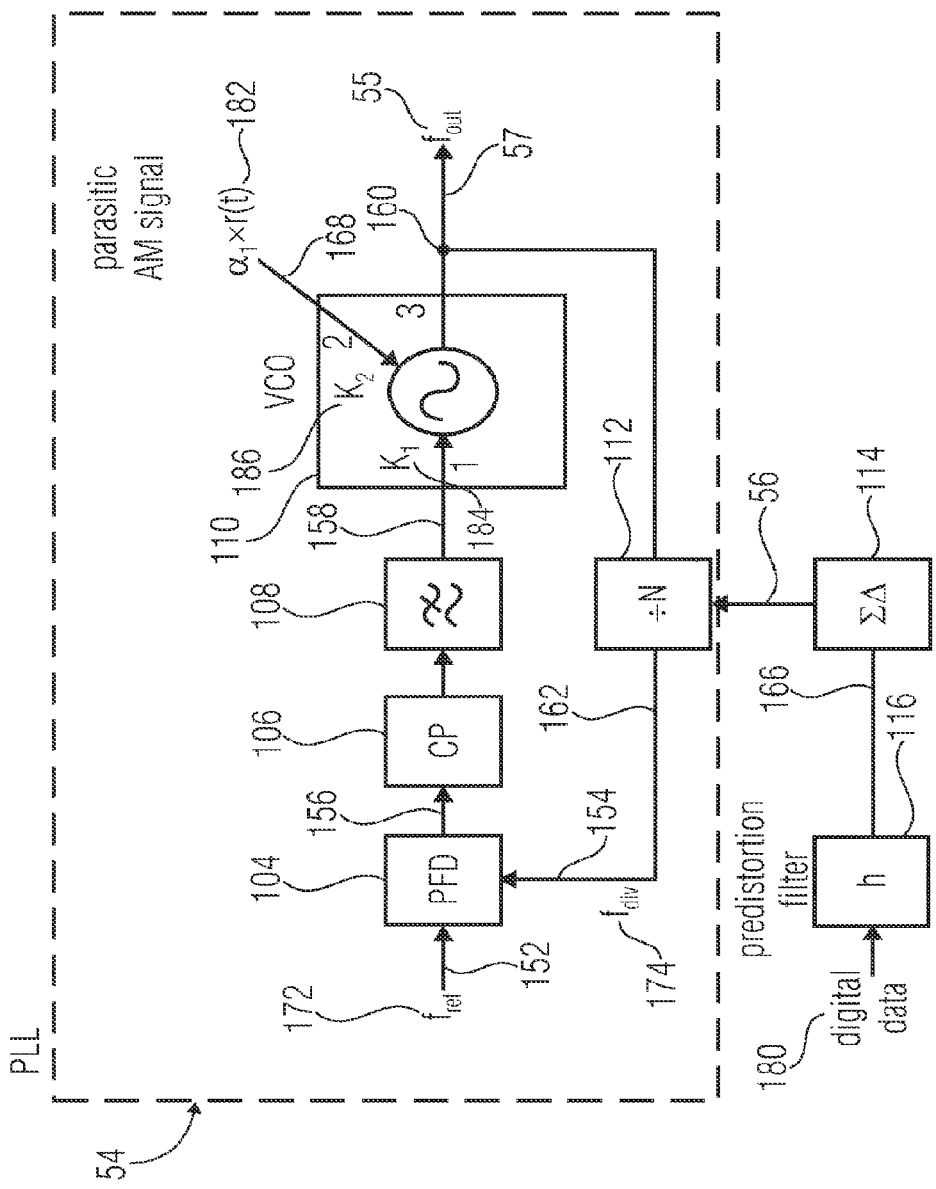

ical signal. The polar modulator further includes a control value generator which is implemented to generate the control value based on the amplitude information and phase information, the control value generator being implemented to additively overlay a signal value derived from the amplitude information and a signal value corresponding to the phase information or a signal value derived from the phase information in order to generate the control value.

POLAR MODULATOR AND METHOD FOR GENERATING A POLAR-MODULATED SIGNAL

CROSS-REFERENCE TO RELATED APPLICATIONS

This application claims priority from German Patent Application No. 102008021876.6-31, which was filed on May 2, 2008, and is incorporated herein in its entirety by reference.

BACKGROUND OF THE INVENTION

Embodiments according to the invention relate to a polar modulator.

Some embodiments according to the invention relate to a polar modulator which may be used in mobile radio telephones which use modulation methods with a non-constant envelope for increasing the data rate, for example according to the mobile radio standard GSM-EDGE (GSM=global system for mobile communication; EDGE=enhanced data rate for GSM evolution).

With the rapidly progressing development on the mobile radio market, the development of power-efficient wireless transmit/receive architectures has become an important point for the design of portable mobile devices. Mobile radio telephones of the next generation which utilize the GSM-EDGE standard for example use modulation methods with a non-constant envelope for achieving higher data rates. The manufacturers of cellular mobile radio telephones in some cases request similar talk and standby times for the GSM standard of the next generation. In order to fulfill this request, or at least to make a contribution to the same, power-efficient radio transmission architectures are needed.

In the latest generation of transceivers, a polar modulator concept is being used more and more the advantage of which is its robustness against parasitic couplings of the power amplifier output signal into the phase-locked loop of the polar modulator. This concept has already proved successful for GSM-GPRS systems (GPRS=general packet radio service). For EDGE systems, however, the coupling of the output signal into the voltage-controlled oscillator (VCO) of the phase-locked loop (PLL) sometimes causes the generation of unwanted AM/FM signal components (AM=amplitude modulation, FM=frequency modulation) which become noticeable with an interference of the FM signal at the output of the VCO. The unwanted AM/FM signal components lead to a significant deterioration of the modulation spectrum and increase error performance. Partially, by this the tolerance mask of the frequency spectrum may be violated with GSM-EDGE modulations.

In order to reduce the influence of the parasitic coupling path of the output signal of the power output stage with GSM-EDGE modulation methods, suitable measures at the polar modulator are desired which prevent such a coupling of the output signal, and compensate or at least suppress the same.

SUMMARY

Some embodiments according to the invention provide a polar modulator and a method for generating a polar-modulated signal.

A polar modulator for generating a polar-modulated signal based on amplitude information and phase information includes, for example, a phase-locked loop for setting a frequency depending on a control value in order to obtain a phase-locked loop output signal. The polar modulator further includes a modulation means for combining an amplitude signal derived from the amplitude information with the phase-locked loop output signal in order to generate the polar-modulated signal. The polar modulator further includes a control value generator which is implemented to generate the control value based on the amplitude information and phase information, the control value generator being implemented to additively overlay a signal value derived from the amplitude information and a signal value corresponding to the phase information or a signal value derived from the phase information in order to generate the control value.

BRIEF DESCRIPTION OF THE DRAWINGS

In the following, embodiments according to the invention are described in more detail with reference to the accompanying drawings, in which:

FIG. 3a shows a block diagram of a PLL circuitry in a polar modulator according to an embodiment of the present invention for illustrating the coupling of a parasitic AM signal into the VCO;

FIG. 5b shows a characteristic transmission function from a VCO output to an AM compensation path according to the embodiment in FIG. 5a;

FIG. 5c shows a block diagram of the AM compensation path according to the embodiment in FIG. 5a;

FIG. 6b shows a characteristic transmission function from a VCO output to an AM compensation path according to the embodiment in FIG. 6a.

DETAILED DESCRIPTION OF THE INVENTION

Figure 1:
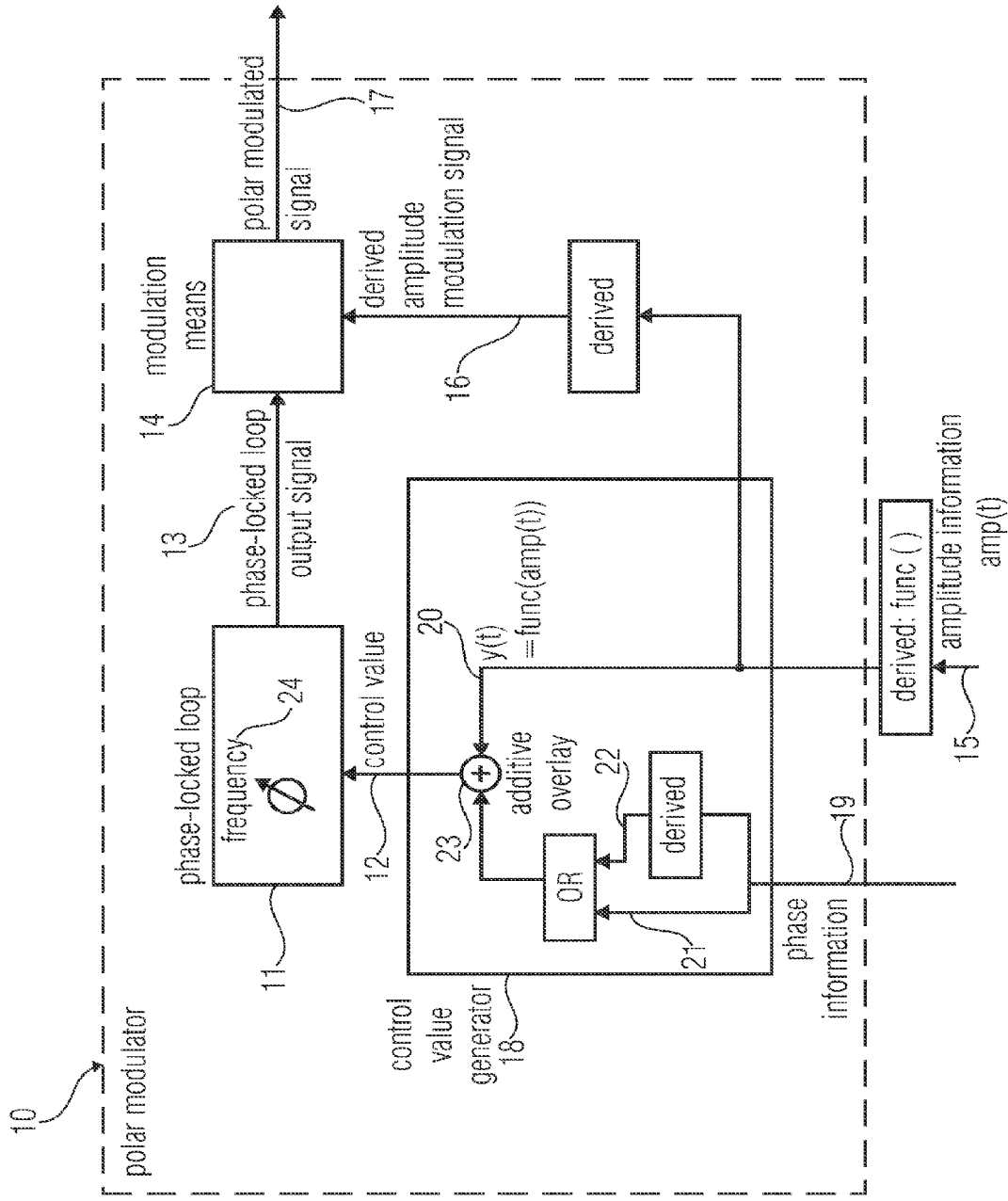
FIG. 1 shows a schematical block diagram of a polar modulator according to an embodiment of the invention.

In the following, with reference to the accompanying FIGS. 1 to 9, embodiments of a polar modulator and a method for generating a polar-modulated signal are now illustrated in detail.

With reference to the following description of the embodiments according to the invention, it should be noted that, in the description and in the different figures, the same reference numerals are used for functionally identical or seemingly identical or equivalent elements for reasons of clarity.

FIG. 1 shows a block diagram of a polar modulator according to an embodiment of the invention. The polar modulator 10 generates a polar-modulated signal 17 based on amplitude information 15 and phase information 19. The polar modulator 10 includes a phase-locked loop 11 for setting a frequency 24 depending on a control value 12 to obtain a phase-locked loop output signal 13. The polar modulator 10 further includes a modulation means 14 for combining an amplitude signal 16 derived from the amplitude information 15 with the phase-locked loop output signal 13 to generate the polar-modulated signal 17. Further, the polar modulator 10 includes a control value generator 18 which generates the control value 12 based on the amplitude information 15 and the phase information 19. The control value generator 18 is implemented to additively overlay 23 a signal value 20 derived from the amplitude information 15 and a signal value 21 corresponding to the phase information 19 or a signal value 22 derived from the phase information 19 in order to generate the control value 12.

The derived amplitude modulation signal 16 may also be based on the amplitude information 15 instead of being derived from the amplitude information 15. The signal value 20 derived from the amplitude information 15 may also be based on the amplitude information 15.

The signal value y(t) derived from the amplitude information 15 may be derived from the signal amp(t) based on the amplitude information 15 by a linear operation, e.g. a multiplication by a factor K1.

The signal value y(t) derived from the amplitude 10 information 15 may also be derived from the signal amp(t) based on the amplitude information 15 using any non-linear function func(t), i.e. y(t)=func(amp(t)).

For example, this may be a Taylor series or a power series, e.g. a function of the following form $$y(t) = \sum_n K_n (amp(t))^{n/k}.$$

For a transmitter concept having an RF oscillator (RF=radio frequency) which is based on double the terminal frequency, for example the three cases described in the following may be used:

$$y(t)=K1*amp(t), \quad 1$$

$$y(t)=K2*amp(t)^2, \quad 2$$

$$y(t)=K1*amp(t)+K2*amp(t)^2. \quad 3$$

For a transmitter concept having an RF oscillator which is based on four times the terminal frequency, the signal y(t) may, for example, be generated as follows:

$$y(t)=K1*amp(t)^4. \quad 4$$

Embodiments according to the invention according to FIG. 1 thus further include signal values y(t) derived from the amplitude information 15, which are formed by means of a non-linear pre-distortion of the signal amp(t) based on the amplitude information 15.

The derivation of the signal amp(t) based on the amplitude information may already have taken place outside the polar modulator 10, i.e. the polar modulator has a pre-distorted, or derived, signal value y(t) applied to its amplitude signal input. The derivation may in a further embodiment also be part of the polar modulator 10, i.e. the signal values y(t) derived from the amplitude information 15 are generated in the polar modulator 10, for example in the control value generator 18.

Figure 2:
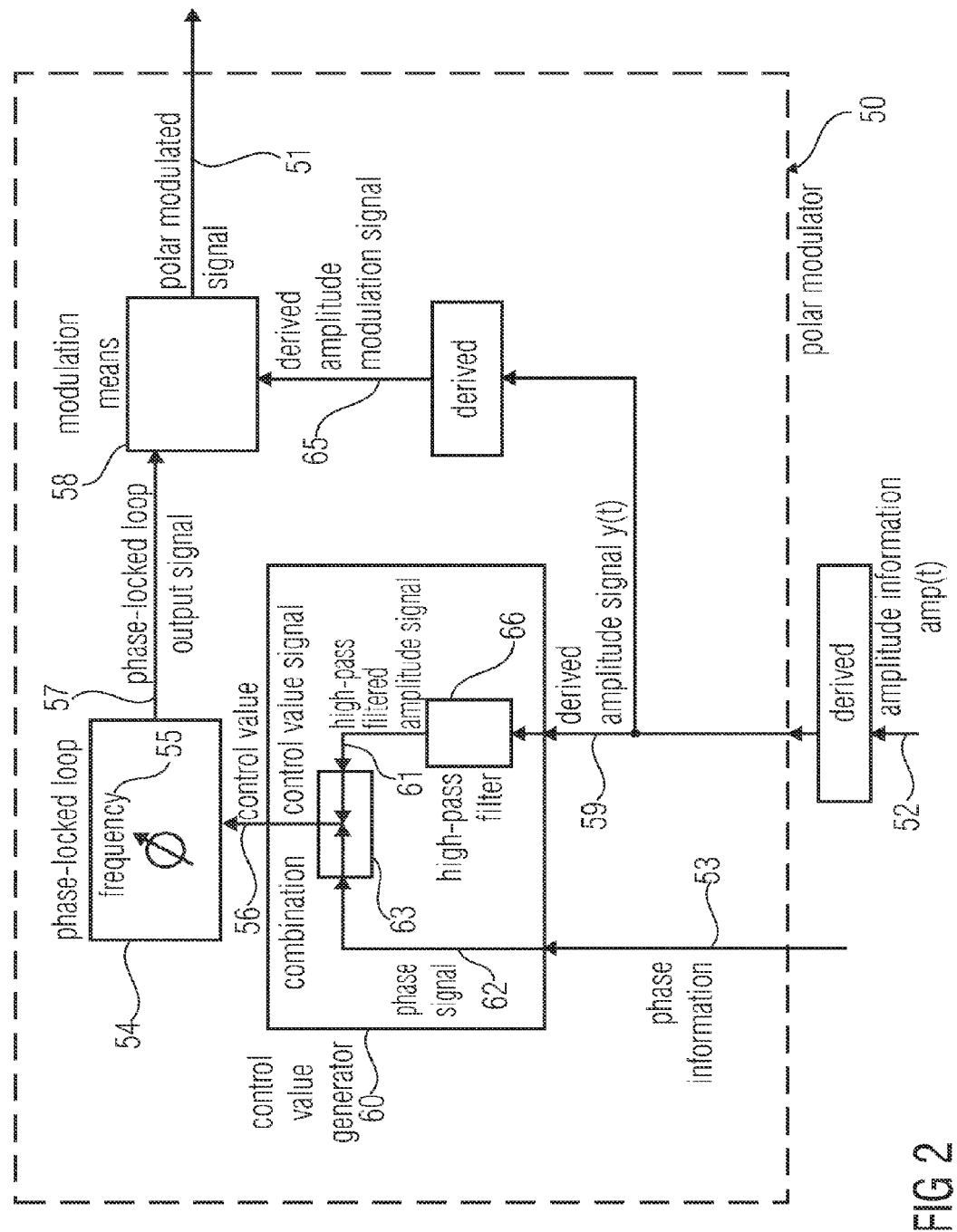
FIG. 2 shows a block diagram of a polar modulator having a high-pass filter according to an embodiment of the invention.

FIG. 2 shows a schematical block diagram of a polar modulator 50 having a high-pass filter 66 according to an embodiment of the invention. The polar modulator 50 generates a polar-modulated signal 51 based on amplitude information 52 and phase information 53. The polar modulator 50 includes a phase-locked loop 54 for setting a frequency 55 depending on a control value 56 to obtain a phase-locked loop output signal 57. The polar modulator 50 further includes a modulation means 58 for combining an amplitude modulation signal 65 derived from the amplitude information 52 with the phase-locked loop output signal 57 to generate the polar-modulated signal 51. Further, the polar modulator 50 includes a control value generator 60 which is implemented to filter an amplitude signal 59 derived from the amplitude information 52 using a high-pass filter 66 to obtain a high-pass filtered amplitude signal 61. The control value generator 60 is further implemented to combine the high-pass filtered amplitude signal 61 with a phase signal 62 based on the phase information 53 (indicated at reference numeral 63) to generate a control value signal representing the control value 56.

The amplitude signal 59 derived from the amplitude information 52 may, for example, be derived from the amplitude information 52 using any non-linear or linear function according to the embodiment of FIG. 1.

The derivation of the signal amp(t) based on the amplitude information 52 may already have taken place outside the polar modulator 50, i.e. the polar modulator 50 has a pre-distorted, or derived, signal value y(t) applied to its amplitude signal input. The derivation may, however, in a further embodiment also be part of the polar modulator 50, i.e. the signal values y(t) derived from the amplitude information 52 are generated in the polar modulator 50, for example in the control value generator 60.

The amplitude signal 59 derived from the amplitude information 52 may also be a signal based on the amplitude information 52.

The high-pass filtered amplitude signal 61 may, for example, correspond to the signal value 20 derived from the amplitude information 15 according to FIG. 1. The high-pass filter 66 may, for example, execute an operation which leads to the generation of the signal value 20 derived from the amplitude information 15 according to FIG. 1. A combination 63 of the high-pass filtered amplitude signal 61 and the phase signal 62 may, for example, include an additive overlay 23 according to FIG. 1. The combination 63 may, however, also include setting or scaling the phase signal 62 depending on the amplitude information 52 or further or other operations, respectively. The control value generator 60, the phase-locked loop 54 and the modulation means 58 may, for example, correspond to the control value generator 18, the phase-locked loop 11 and the modulation means 14 according to FIG. 1.

With reference to FIG. 3a, in which a block diagram of a PLL circuitry in a polar modulator is illustrated, the coupling of a parasitic AM signal into the voltage-controlled oscillator (VCO) is explained in detail.

A PLL 54 (PLL=phase-locked loop) according to an embodiment of the present invention includes a phase detector 104 having a reference input 152, to which a reference signal with a reference frequency $f_{ref}$ is supplied, for example by a reference generator. The phase detector 104 further comprises a feedback input 154 to which a signal fed back from, or into, the phase-locked loop 54 having a modulated frequency $f_{div}$ is supplied. The signals applied to the inputs 152 and 154 are compared regarding their phase in the phase detector 104. Depending on this comparison, the detector 104 generates a control signal at its output 156 which is applied to a control input 158 of a voltage-controlled oscillator (VCO) 110 via a charge pump 106 and a loop filter 108. Depending on this control signal, which basically represents the phase difference of the signals 172 and 174 applied to the inputs 152 and 154, the voltage-controlled oscillator 110 changes the frequency $f_{out}$ of its output signal. At the output 160 of the voltage-controlled oscillator 110 a node is provided, which is coupled to a feedback path 162. The feedback path 162 includes a frequency divider 112 having a settable division ratio N. The frequency divider 112 divides the frequency of a signal applied to the input side, i.e. a signal of the frequency $f_{out}$ by a division factor N which may be regulated via the control value 56 at the setting input, and supplies the frequency-divided signal having the modulated, and/or divided, frequency $f_{div}$ to the feedback input 154 of the phase detector 104. The control value 56 corresponds to the value at the output of a sigma/delta modulator 114 whose signal input 166 is coupled to the output of a pre-distortion filter 116. Digital data 180 is supplied to the sigma/delta converter 114 after filtering by the pre-distortion filter 116.

Depending on the digital data 180 comprising a PM signal portion and an AM signal portion in embodiments according to the invention, the division factor N of the frequency divider 112 is set and thus causes a modulation of the output signal 160 of the voltage-controlled oscillator 110 depending on the digital data 180. If the output signal 160 of the voltage-controlled oscillator 110 is amplified after a combination with an AM signal portion which is not illustrated in detail in FIG. 3a, a coupling of the amplified AM signal component into the voltage-controlled oscillator 110 results. The coupling in this embodiment is caused at a second input 168 of the voltage-controlled oscillator 110 and leads to a wrong setting and/or to a parasitic frequency modulation of the output signal 160 of the voltage-controlled oscillator 110. The parasitic AM signal 182 thus causes a wrong setting of the free-running oscillator frequency $f_{out}$. The parasitic AM signal 182 may also be regarded as an interference signal of the AM path of the polar modulator. In embodiments according to the invention, a "modulation" and/or an influencing of the FM (frequency modulation) path (precisely, the feedback path 162), is caused depending on a division ratio N. In embodiments according to the invention, the division ratio N is, in turn, dependent on the AM signal path of the polar modulator, to thus supply a signal to the voltage-controlled oscillator 110 at its control input 158 which depends on an AM signal component just like the signal at the "interference input" or, respectively, the parasitic coupling path 168. With a suitable setting of the signal at the control input 158, the voltage-controlled oscillator 110 may compensate the AM signal portion or, respectively, the parasitic coupling of the amplitude modulation into the VCO and thus generate an output signal 160 which is similar to an output signal 160 without a coupling of a parasitic interference signal 182.

The coupling of the AM signal into the VCO 110, for example via the parasitic coupling path 168, causes a frequency modulation of the VCO 110 by the AM signal. This may be expressed mathematically by the following equation:

$$f_{VCO}(t)=f_{01}+K_2 \cdot \alpha_1 \cdot r(t-\tau),$$

wherein $K_2$ designates the VCO sensitivity factor in MHz/V, $r(t-\tau)$ describes the AM signal component and $\alpha_1$ describes the amplification factor which takes the amplification of the coupling path 168 of the parasitic AM signal 182 into consideration. The time offset $\tau$ takes the delay of the coupling path into the VCO 110 into consideration. The VCO sensitivity factor $K_2$ depends on the "coupling input" and/or the coupling path 168 of the (amplified) output signal 160. With a direct coupling onto the control input 158 of the VCO 110, the sensitivity factor $K_2$ 186 is identical to a setting sensitivity factor $K_1$ 184 of the VCO 110. The PM signal component of the polar modulator causes a shift of a nominal oscillator frequency $f_0$ which is taken into consideration by a new free-running oscillator frequency $f_{01}$. The output signal 160 of the oscillator 110 may be described as follows:

$$S_{VCO}(t=\cos(\omega t+\phi(t))=\cos(2\pi f_{01}t+2\pi K_2 \cdot \alpha_1 \cdot r(t-\tau) \cdot t)$$

The feedback mechanism of the PLL 54 is able to compensate frequency components within the loop bandwidth of the PLL and/or the phase-locked loop 54. Frequency components comprising a higher frequency than the loop bandwidth may not be suppressed by the PLL 54, as the loop, or the PLL, 54 is not able to follow quick frequency changes of the VCO 110. Thus, the transmission function of the "interference input" 168 of the VC0 110 to which the parasitic AM signal 182 is applied comprises a high-pass characteristic with regard to the output 160 of the VCO 110. The same high-pass characteristic should also comprise a transmission function of a control input 158 of the VCO 110 with regard to the output 160 of the VCO 110 to cause an optimum compensation of the unwanted parasitic AM signal 182. Embodiments according to the invention comprise this high-pass characteristic.

In the case of an optimum suppression of the parasitic AM signal 182 with the signal component $\alpha_1 r(t-\tau)$, the frequency of the output signal 160 of the VCO 110 may be described by:

$$f_{VCO}(t)=f_{01}+K_2 \cdot \alpha_1 r(t-\tau)-\tilde{K}_2\tilde{\alpha}_1\tilde{r}(t-\tau)\approx f_{01}.$$

$\tilde{K}_2$ and $\tilde{\alpha}_1\tilde{r}(t-\tau)$ represent estimates of the VCO sensitivity factor $K_2$ 186 or the parasitic AM signal component 182, respectively. Although the AM signal r(t) is known exactly, the amplification $\alpha_1$ and a carrier phase offset value $\phi=\omega_0\tau$ are estimated due to the unknown mobile radio coupling path. In order to facilitate this, in embodiments according to the invention an amplification block $G=\hat{a}_1$ and a settable time delay $\tau$ are introduced into the AM compensation path. The time delay estimate $\tilde{\tau}$ should in some embodiments be controlled very precisely, to an order of magnitude in the range of several nanoseconds, in order to be able to compensate the carrier phase offset value $\phi=\omega_0\tau$ of the parasitic output signal coupling of the high-frequency signal.

Figure 3B:
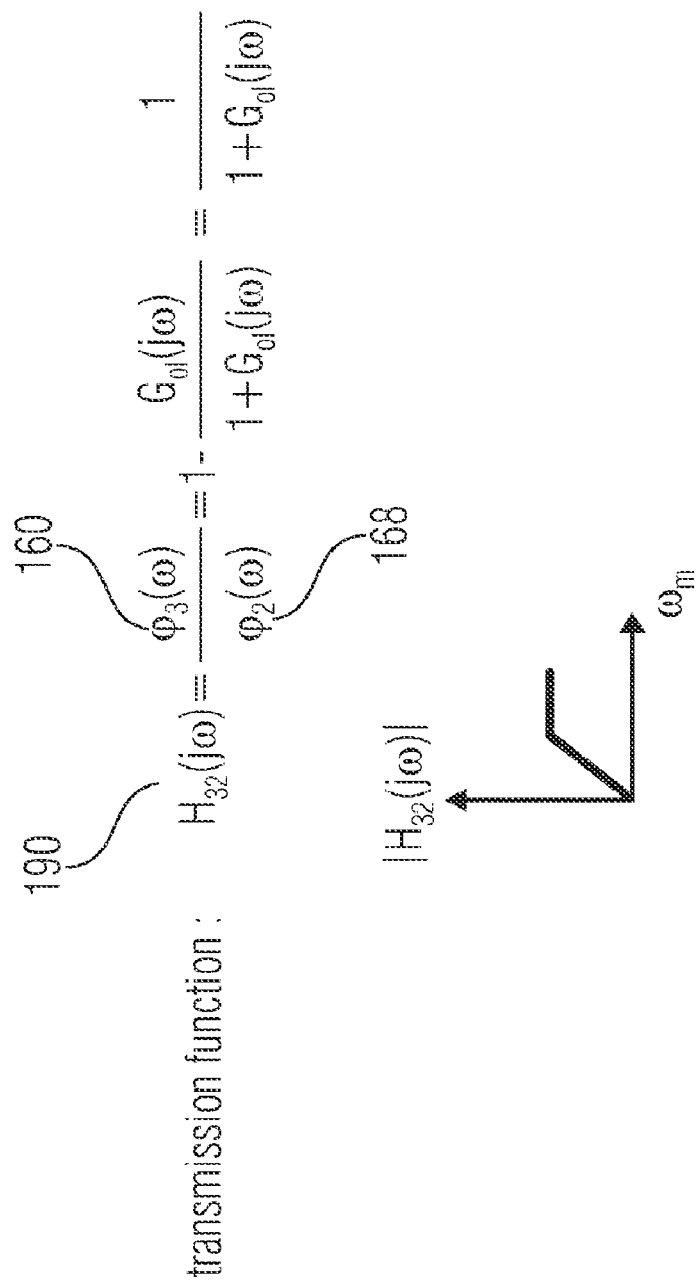
FIG. 3b shows a schematic illustration of a characteristic transmission function of a parasitic AM signal component to the output of the VCO with a high-pass characteristic.

FIG. 3b shows a schematical illustration of a characteristic transmission function of a parasitic AM signal component to the output of the VCO having a high-pass characteristic. The interference transmission function 190 here corresponds to the transmission of the "interference input" 168 of the VCO 110 to the output 160 of the VCO 110. As already mentioned above, the phase-locked loop 54 (per se) may only compensate frequencies or interferences, respectively, or parasitic couplings, within the bandwidth of the PLL 54. With higher-frequency signal portions, the PLL 54 may no longer react quickly enough to also compensate these higher-frequency signal portions. I.e., the higher the frequency of the parasitic AM signal 182 coupled in at the "interference input" 168 of the VCO 110, the less the frequency component may be compensated, or corrected. I.e., the interference transmission function 190 of the interference input 168 to the output 160 of the VCO 110 comprises a high-pass characteristic as it is schematically illustrated in FIG. 3b. In order to cause a compensation of the parasitic AM signal 182 which is as good as possible, a compensation transmission function of the AM signal component at the input of the polar modulator to the output 160 of the VCO 110 should comprise a transmission function identical to the interference transmission function 190 illustrated in FIG. 3b. In embodiments according to the invention, this requirement is fulfilled.

Figure 4:
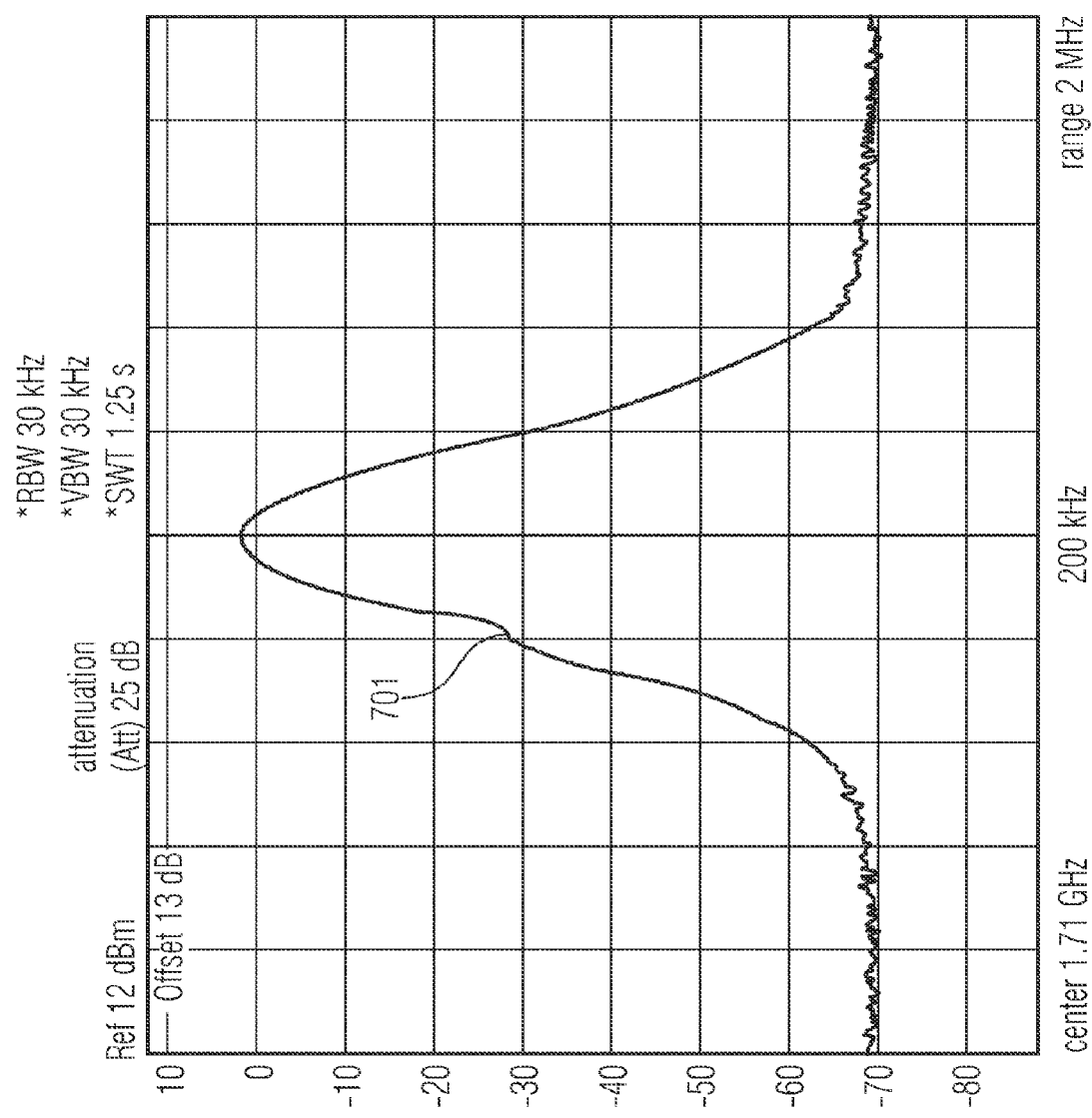
FIG. 4 shows a characteristic frequency spectrum of a power output signal of a polar modulator without an interference signal compensation.

FIG. 4 shows a characteristic frequency spectrum of a power output signal of a polar modulator without an interference signal compensation. The spectrum corresponds to the spectrum of an EDGE-PRBS (PRBS=pseudo random binary sequence) modulated signal, wherein the AM/FM coupling, or the coupling of the parasitic AM signal 182, into the VCO 110 causes an asymmetric spectrum which causes a violation of the GSM-EDGE spectral tolerance mask in this exemplary illustration. The illustration in FIG. 4 serves as a reference with regard to a polar modulator which comprises no compensation of parasitic AM/FM signal components, to thus quantitatively compare the effect of the compensation of parasitic AM/FM signal components.

In the following, an illustration with a parasitic AM/FM signal component compensation is described with reference to FIGS. 5a-5c. It is the object of embodiments according to the invention to compensate and/or to reduce the asymmetrical left edge 701 of the frequency spectrum according to FIG. 4 which occurs approximately 200 kHz below the center frequency at 1.71 GHz and comprises an absolute value of about −28 dBm.

Figure 5A:
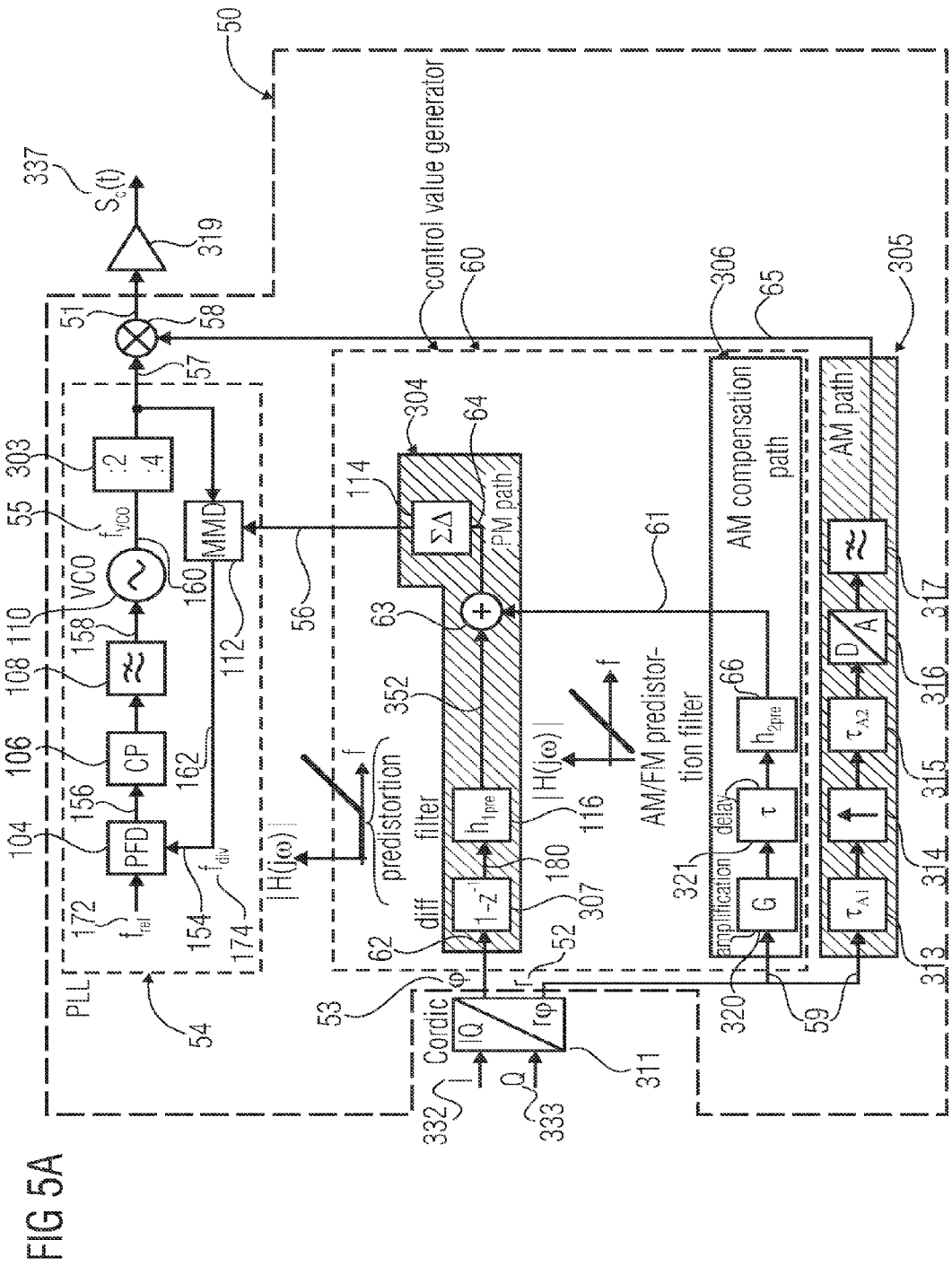
FIG. 5a shows a block diagram of a polar modulator having a compensation filter according to an embodiment of the invention.

FIG. 5a shows a block diagram of a polar modulator having a compensation filter according to an embodiment of the invention. The polar modulator 50 includes a phase-locked loop, or PLL, 54 which is different from the phase-locked loop 54 according to FIG. 3a with regard to an additional frequency divider 303. The frequency divider 303 divides the frequency $f_{VCO}$ generated by the voltage-controlled oscillator 110 in this embodiment by two or by four, before the phase-locked loop output signal 57 is output with a frequency generated by the PLL 54. In further embodiments, the frequency divider 303 may also comprise another, for example integer value. For example, a division value of 1 would be possible, and then the PLL 54 would correspond to the PLL 54 according to FIG. 3a.

The polar modulator 50 further includes a phase modulation path, or PM path, 304, an amplitude modulation path, or AM path, 305 and an amplitude modulation compensation path, or AM compensation path, 306. The PM path 304 refers to a circuit including a differentiator 307, a pre-distortion filter 116, a summation member 63 and a sigma/delta modulator 114.

The PM path 304 and the AM compensation path 306 may be part of a control value generator 60. The control value generator 60 generates, using the amplitude signal 59 derived from the amplitude information 52 and using the phase signal 62 based on the phase information 53, a control value signal representing the control value 56. The amplitude signal 59 derived from the amplitude information 52 may, for example, be derived from the amplitude information 52 using any non-linear or linear function according to the embodiment of FIG. 1.

The derivation of the amplitude signal based on the amplitude information 52 may already have taken place outside the polar modulator 50, i.e. the polar modulator 50 has an amplitude signal 59 derived from the amplitude information 52 available. The derivation may, in a further embodiment, also be part of the polar modulator 50, i.e. the polar modulator 50 has a signal based on the amplitude information 52 available, from which the polar modulator generates the amplitude signal 59 derived from the amplitude information 52, for example in the control value generator 60.

The amplitude signal 59 derived from the amplitude information 52 may, however, also correspond to the amplitude signal based on the amplitude information 52.

The amplitude signal 59 is amplified using an amplification means 320, delayed using a delay means 321, high-pass filtered using an AM/FM pre-distortion filter 66 corresponding to the high-pass 66 according to FIG. 2, and combined in the summation member 63 corresponding to the combination 63 according to FIG. 2, with a signal 352 derived from the phase signal 62.

In the following, a concept for generating the modulated output signal 51 is described. While I/Q modulators process the I,Q value pairs for a modulation of a signal, i.e. a real component 1332 and a second component, or quadrature component, Q 333, which together designate a symbol, polar modulators 50 modulate the phase φ to a carrier signal and change the amplitude r. A symbol (for example a complex-valued data symbol) may, for example, be described by means of its real component 332 and its quadrature component 333, but also (alternatively) by means of its phase 53 and its amplitude 52. The coordinate transformation may be executed using a circuit 311. The circuit 311 may, for example, use the so-called "cordic" algorithm. The polar modulator 50 may include the circuit 311. The circuit 311 may, however, also be located outside the polar modulator 50, so that the phase 53 and the amplitude 52 are supplied to the polar modulator 50 by the coordinate transformation circuit 311.

In one embodiment, the phase and/or phase information 53 is supplied to the PM path 304, wherein the phase, or phase information, 53 passes through the differentiator 307, the pre-distortion filter 116, the summation member 63 and the sigma/delta converter 114. The differentiator 307 executes a differentiation of the phase 53 over time, so that frequency signal 180 results from the phase signal 62 which is pre-distorted via the pre-distortion filter 116 with the mapped frequency response which, for example, comprises a high-pass characteristic. The pre-distorted, differentiated phase 352 (and/or the corresponding frequency information) reaches the addition member 63 which adds a further signal component 61 described later. The output signal of the addition member is supplied to the sigma/delta converter 114. The output signal of the sigma/delta converter 114 is, for example, the output signal of the PM path 304 and corresponds to the control value 56 applied to the PLL 54.

The polar modulator 50 further includes an AM path 305 comprising a first delay stage 313, a sampling rate increasing means 314, a second delay stage 315, a digital/analog converter (D/A converter) 316 and a smoothing filter 317. The amplitude signal 59 passes the first delay member 313, the sampling rate increasing member 314, the second delay member 315, the D/A converter 316 and the smoothing filter 317 and reaches the output 65 of the AM path 305.

The output 65 of the AM path 305 and the output 57 of the PLL 54 are switched to the modulation means 58. Thus, an amplitude information 52 of the AM path 305 is additionally added to the phase-modulated output signal 57 of the PLL 54 including the phase information 53 of the PM path 304. For example, an amplitude of the phase-modulated output signal 57 is modulated depending on the output signal provided by the AM path 305 with regard to its amplitude. An output signal of the modulation means 58 in this embodiment passes a power amplification output stage 319 which causes a corresponding amplification and generates an output signal $s_c(t)$ (337).

The power amplification output stage 319 does not need to be part of the polar modulator 50. The polar-modulated signal 51 may also be amplified outside the polar modulator 50.

The output signal 337 comprises an AM component which is generated by the amplitude modulation of the amplitude signal 59. This AM component of the output signal 337 (or a corresponding fluctuation of a supply voltage) may feed back to the VCO 110 of the PLL 54. The AM component of the output signal 337 for example corresponds to the parasitic AM signal 182 according to FIG. 3*a*.

For the compensation of this AM component, the polar modulator 50 comprises an AM compensation path 306 which includes an amplification member 320, a delay member 321 and an AM/FM pre-distortion filter 66. The AM/FM pre-distortion filter 66 comprises a frequency response whose absolute value rises, for example, at least approximately linearly with the frequency or a logarithm of the frequency. It corresponds to a high-pass filter.

The amplitude signal 59 passes the AM compensation path 306, i.e. the amplification member 320, the delay member 321 and the AM/FM pre-distortion filter 66 and reaches the output 61 of the AM compensation path 306. The output 61 is connected to an input of the PM path 304, the input forming a second input of the summation member 63. Thus, by means of the summation member 63, in this embodiment, the pre-distorted, differentiated phase signal 352 is additively overlaid with the amplified, delayed and pre-distorted amplitude signal 61 in the PM path 304. The amplitude signal 59 may, after a corresponding filtering in the AM compensation path 306, influence the voltage-controlled oscillator 110 as a control value 56 of the PLL 54. In embodiments according to the invention, the transmission function of the amplitude signal 59 to the output 160 of the VCO 110 is similar to the interference transmission function of the AM component of the output signal 337 to the output 160 of the VCO 110. In order to match both transmission functions, the amplification member 320, the delay member 321 and the AM/FM pre-distortion filter 66 may be set and/or selected such that both transmission functions are virtually identical. In this case, the parasitic coupling of the AM/FM component of the output signal 337 onto the voltage-controlled oscillator 110 (or a frequency modulation of the output signal 57 based on the amplitude modulation) may be compensated or suppressed, respectively.

Figure 5B:
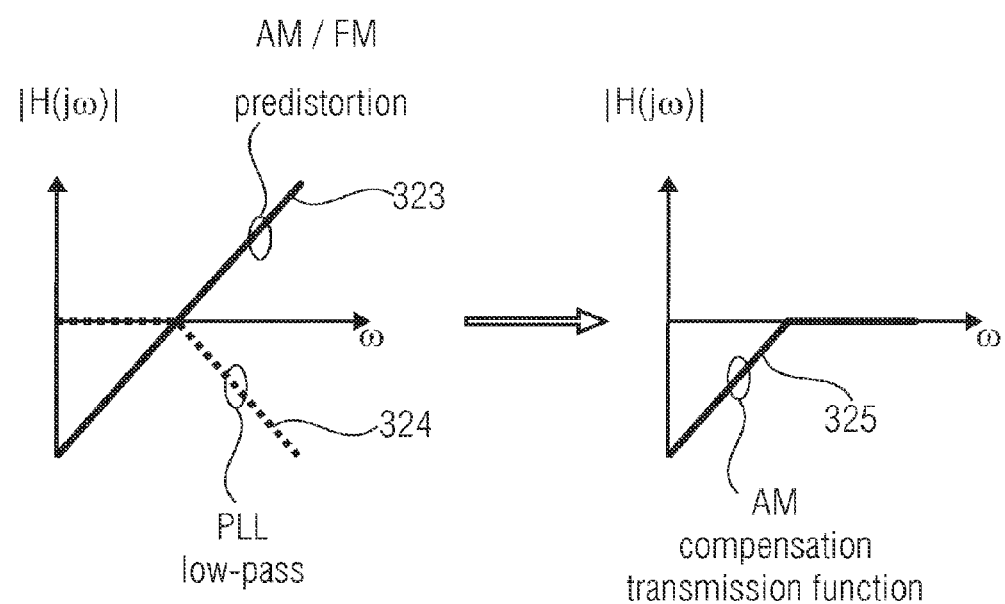

FIG. 5*b* shows a characteristic transmission function of the AM compensation path according to the embodiment of FIG. 5*a*. The AM/FM pre-distortion filter 66 for example comprises the illustrated transmission function 323 with a high-pass characteristic. The PLL 54 may be regarded as a low-pass, as the VCO 110 can only correct slowly changing signals at its control input 158, but it can no longer track its output 160 with rapidly changing signals at the control input 158. In other words, with the influence of low-frequency interference influences on the VCO, the phase-locked loop may virtually completely compensate these influences, so that the frequency of the output signal 57 remains virtually constant. With an influence of high-frequency interferences on the VCO, the phase-locked loop can no longer correct the interferences due to a low-pass characteristic of the locked loop (which may, for example, among other things be caused by an inertia of the charge pump 106 and/or by an effect of the low-pass filter 108). Thus, fluctuations of the frequency of the output signal 57 may result which may be compensated by the AM compensation path 306.

The PLL 54 thus comprises a low-pass transmission function 324, for example according to the illustration of FIG. 5*b*. The transmission function of the amplitude signal 52 to the output 160 of the VCO 110 thus corresponds to an overlay of the transmission function 323 of the AM/FM pre-distortion filter 66 with the transmission function 324 of the PLL 54. The amplification member 320 and the delay member 321 cause a further fine setting of the two AM components. The overlay of the high-pass frequency response 323 with the low-pass frequency response 324 results from the cutoff frequency of the low-pass frequency response in a high-pass frequency response 325 of the AM compensation transmission function, i.e. the transmission function of the amplitude signal 59 to the output 160 of the VCO 110.

Figure 5C:
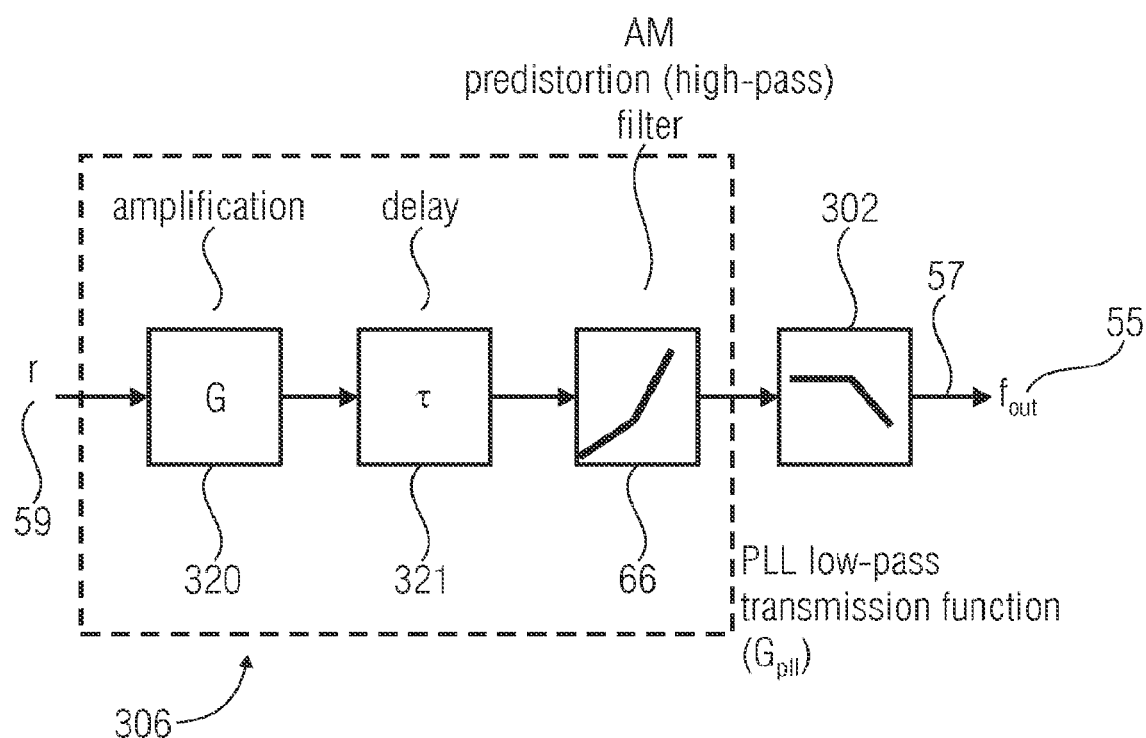

FIG. 5*c* shows a block diagram of the AM compensation path according to the embodiment in FIG. 5*a*. The amplitude signal 59 reaches the input of the phase-locked loop 54 via the amplification member 320, the delay member 321 and the AM compensation pre-distortion filter 66 and also via the sigma/delta converter 114. The AM compensation pre-distortion filter 66, depending on the setting and/or presetting, may comprise a frequency response according to the illustration, for example with two at least approximately linear sections with different inclinations. Further, the pre-distorted amplitude signal reaches the PLL 54 with the PLL low-pass transmission function 302 and generates and/or causes a signal 57 having the frequency $f_{out}$ at the output of the voltage-controlled oscillator 110. The AM compensation pre-distortion filter 66 may in this embodiment be set such that the feedback of the AM portion in the output signal 337 to the VCO is compensated via the signal path of the amplitude signal 59 illustrated in FIG. 5*c* or, respectively, by an effect of the signal path.

Figure 6A:
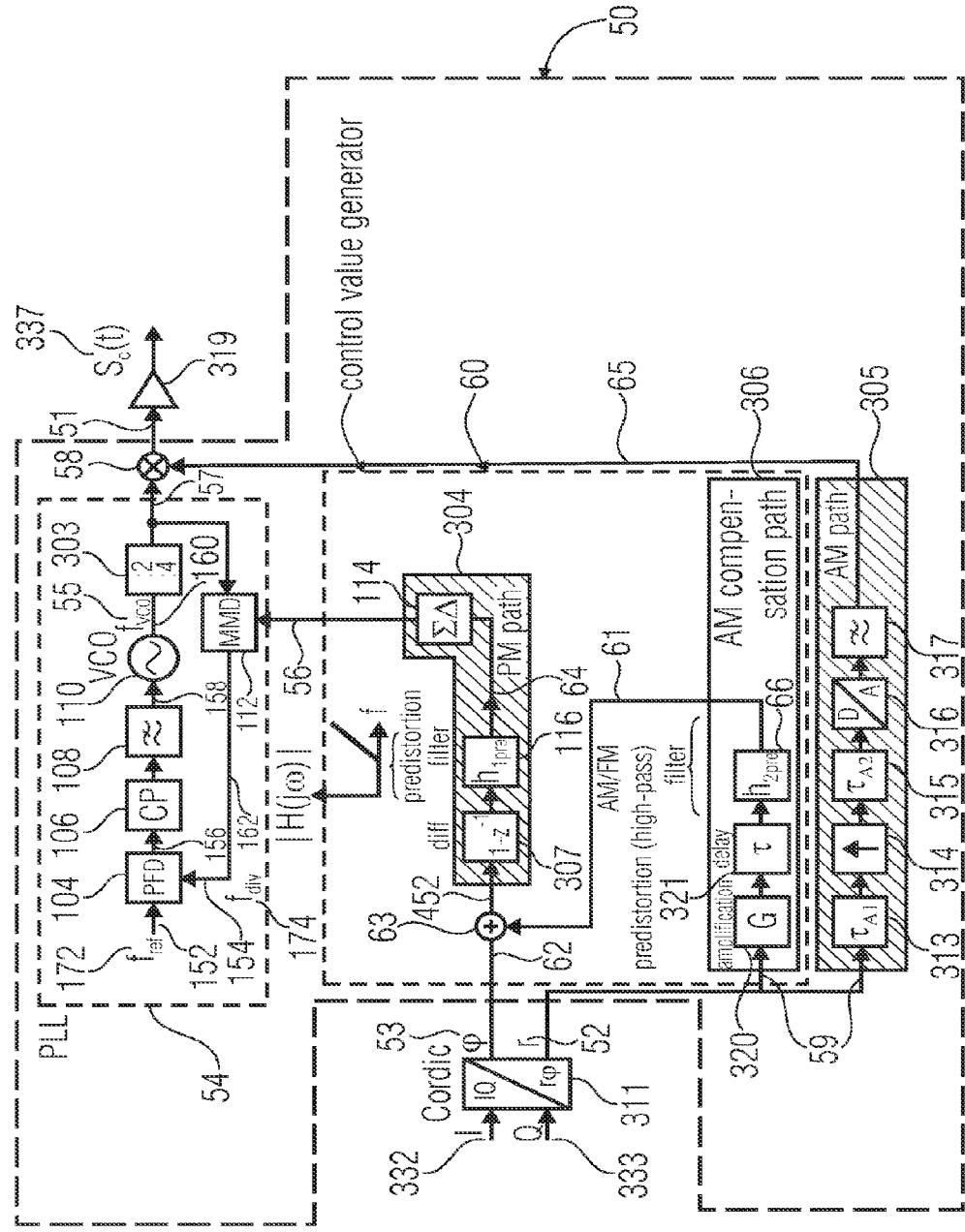
FIG. 6a shows a block diagram of a polar modulator having a compensation filter according to a further embodiment of the present invention.

FIG. 6*a* shows a schematical block diagram of a polar modulator having a compensation filter according to a further embodiment of the invention. The polar modulator 50 includes a PLL 54, an AM path 305 and a control value generator 60.

The control value generator 60 includes a PM path 304 and an AM compensation path 306. From the amplitude signal 59 derived from the amplitude information 52 and the phase signal 62 based on the phase information 53 the control value generator 60 generates a control value signal representing the control value 56 (as well as, based on that, the control value 56 using the sigma/delta converter 114). The amplitude signal 59 derived from the amplitude information 52 may, for example, be derived from the amplitude information 52 using any random non-linear or linear function according to the embodiment of FIG. 1.

The derivation of the amplitude signal based on the amplitude information 52 may have already taken place outside the polar modulator 50, i.e. the polar modulator 50 has an amplitude signal 59 derived from the amplitude information 52 available. The derivation may, in a further embodiment, also be part of the polar modulator 50, i.e. the polar modulator 50 has a signal based on the amplitude information 52 available from which the polar modulator generates the amplitude signal 59 derived from the amplitude information 52, for example in the control value generator 60. The amplitude signal 59 derived from the amplitude information 52 may also correspond to the amplitude signal based on the amplitude information 52.

If applicable, the amplitude signal 59 is high-pass filtered after an amplification and a time delay by means of an AM/FM pre-distortion filter corresponding to the high-pass 66 of FIG. 2, and is combined with the phase signal 62 in the summation member 63 corresponding to the combination 63 of FIG. 2.

The difference between the embodiment according to FIG. 6*a* and the embodiment according to FIG. 5*a* consists in coupling the output signal 61 of the AM compensation path 306 into the PM path 304.

According to FIG. 6*a*, the summation member 63 has been taken out of the PM path 304 and inserted before the PM path 304. Thus, the output signal 61 of the AM compensation path 306 is directly added to the phase signal 62 by the summation member 63 and thereupon passes (together with the phase signal) the differentiator 307 and the pre-distortion filter 116 of the PM path 304. Thus, a transmission function of the amplitude signal 59 to the output 57 of the PLL 54 includes the chain consisting of the amplification member 320, the delay member 321, the AM/FM pre-distortion filter 66, the differentiator 307, the pre-distortion filter 116, the sigma/delta converter 114 and the PLL 54. In some embodiments, thus the fact may be used that in the route and/or in the PM path 304 a pre-distortion filter 116 is already contained, so that the AM/FM pre-distortion filter 66 may be designed more easily, as it needs, for example, only to comprise edges which are less sharp or only needs a lower attenuation.

For the combination of the AM compensation path 306 with the (existing) PM path 304, there are a plurality of possibilities of combinations for the filter blocks contained in the paths.

The amplification member 320 may, for example, be realized by a multiplier or a shift and addition operation. The delay stage 321 should in some embodiments be adjustable in a range of only a few nanoseconds to be able to exactly readjust the phase of the carrier signal. For example, all-pass filter or polyphase filter designs may be used which achieve time delays of fractions of the sampling rate.

The output 65 of the AM path 305 and the output 57 of the PLL 54 are switched to the modulation means 58.

In GSM-EDGE applications, the VCO 110 may, for example, generate a frequency of approximately 3.8 GHz. In the case of GSM 850/900, the frequency divider 303 may divide the output 160 of the VCO 110 by a factor of 4, whereas with GSM 1800/1900 the division ratio may be 2.

The amplification stage 320, the delay stage 321 and the AM/FM pre-distortion filter 66 may, for example, be programmable or settable, respectively. Optimum coefficients of the three members 320, 321, 66 may, e.g., be set after a measurement of the output signal 337 such that an effect of the output signal 337 (or a parasitic effect of an amplitude modulation) on the VCO 110 has as little an influence as possible. It is also possible to adaptively set the coefficients (for example the members 320, 321, 66) for example by means of a control, which adaptively sets the coefficients of the amplification member 320, the delay member 321 and the AM/FM pre-distortion filter 66 such that the signal course of the output signal 337 approaches a predetermined signal course. For this, for example, adaptive gradient methods may be used to find a minimum in a parameter range describing the settable parameters or coefficients, respectively.

Figure 6B:
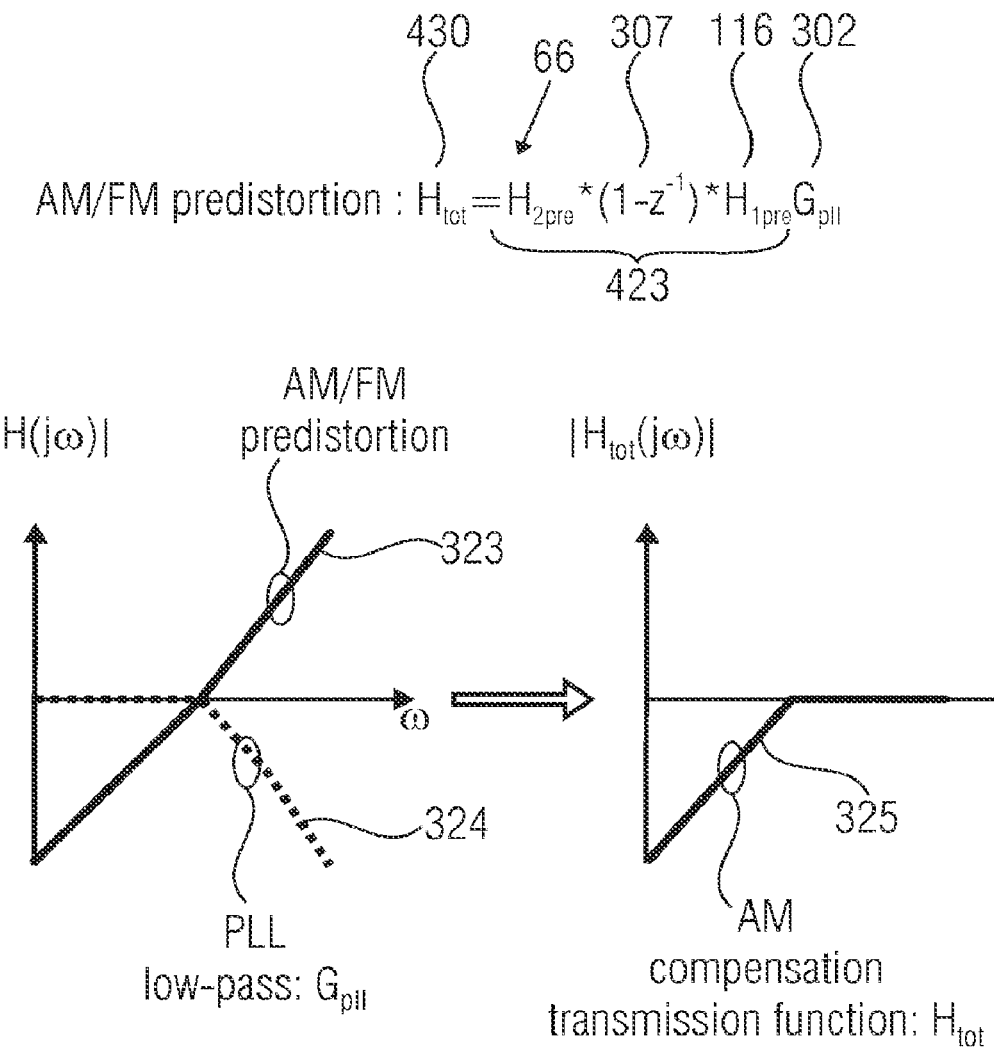

FIG. 6b shows a characteristic transmission function of a complete AM compensation path according to the embodiment in FIG. 6a. The complete and/or effective AM compensation pre-distortion filter 423 includes the AM/FM pre-distortion filter and/or the high-pass filter 66 of the AM compensation path 306, the pre-distortion filter 116 of the PM path 304 and the differentiator 307 of the PM path 304. The transmission function of the complete and/or effective AM compensation pre-distortion filter 423 results in:

$$H_{AM,com}(z) = H_{2pre}(1-z^{-1})H_{1pre}$$

If the low-pass transmission $G_{PLL}$ 302 of the PLL 54 is added to this transmission function, the transmission function of the complete compensation path $H_{tot}$ results, represented by a curve k30, in the following way:

$$H_{tot} = H_{2pre}(1-z^{-1})H_{1pre}G_{PLL}$$

Overlaying the two frequency responses of the (effective) AM/FM pre-distortion 423 and the PLL low-pass and/or the PLL low-pass characteristic 302 results in a frequency response $H_{tot}$ 430 which corresponds to the AM transmission function, i.e. the transmission function of the amplitude signal 59 to the output 57 of the voltage-controlled oscillator 110.

Figure 7:
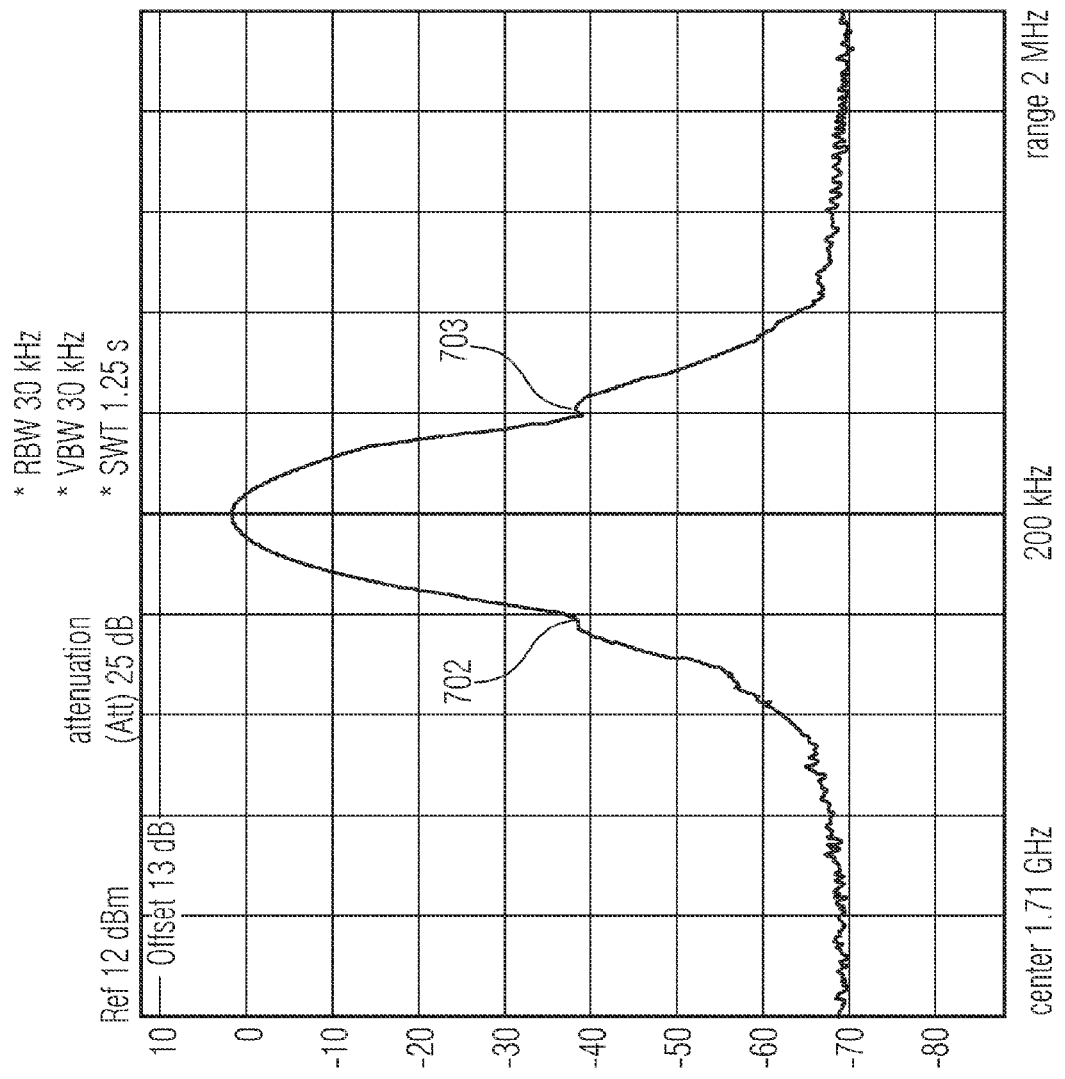
FIG. 7 shows a characteristic frequency spectrum of a power output signal of a polar modulator having a compensation filter according to an embodiment of the present invention.

FIG. 7 shows a characteristic frequency spectrum of a power output signal 337 of a polar modulator 50 having a compensation filter according to an embodiment of the invention. The frequency spectrum corresponds to a spectrum of an EDGE-modulated signal with a virtually perfect compensation of the parasitic AM/FM component. The spectrum shows a symmetrical characteristic and fulfils the requirements on the GSM modulation mask in the frequency range. Compared to the frequency spectrum according to FIG. 4, the left edge 702 moves by approximately 10 dB further downward and, simultaneously, a right edge 703 has formed symmetrically to the center frequency of 1.71 GHz. The influence of the parasitic AM/FM component of the output signal 337 has been reduced by at least 10 dB.

In a further embodiment which is not illustrated in the Figures, the PLL may, for example, also be implemented as a digital phase-locked loop PLL and/or a digital mode-locked or phase-coupled control loop, wherein the voltage controlled oscillator 110 may be a digitally controlled oscillator. The oscillator may, for example, be set by a digital input controlling a bank of capacitors. The digitally controlled oscillator may be digitally modulated without requiring a digital/analog converter.

Figure 8:
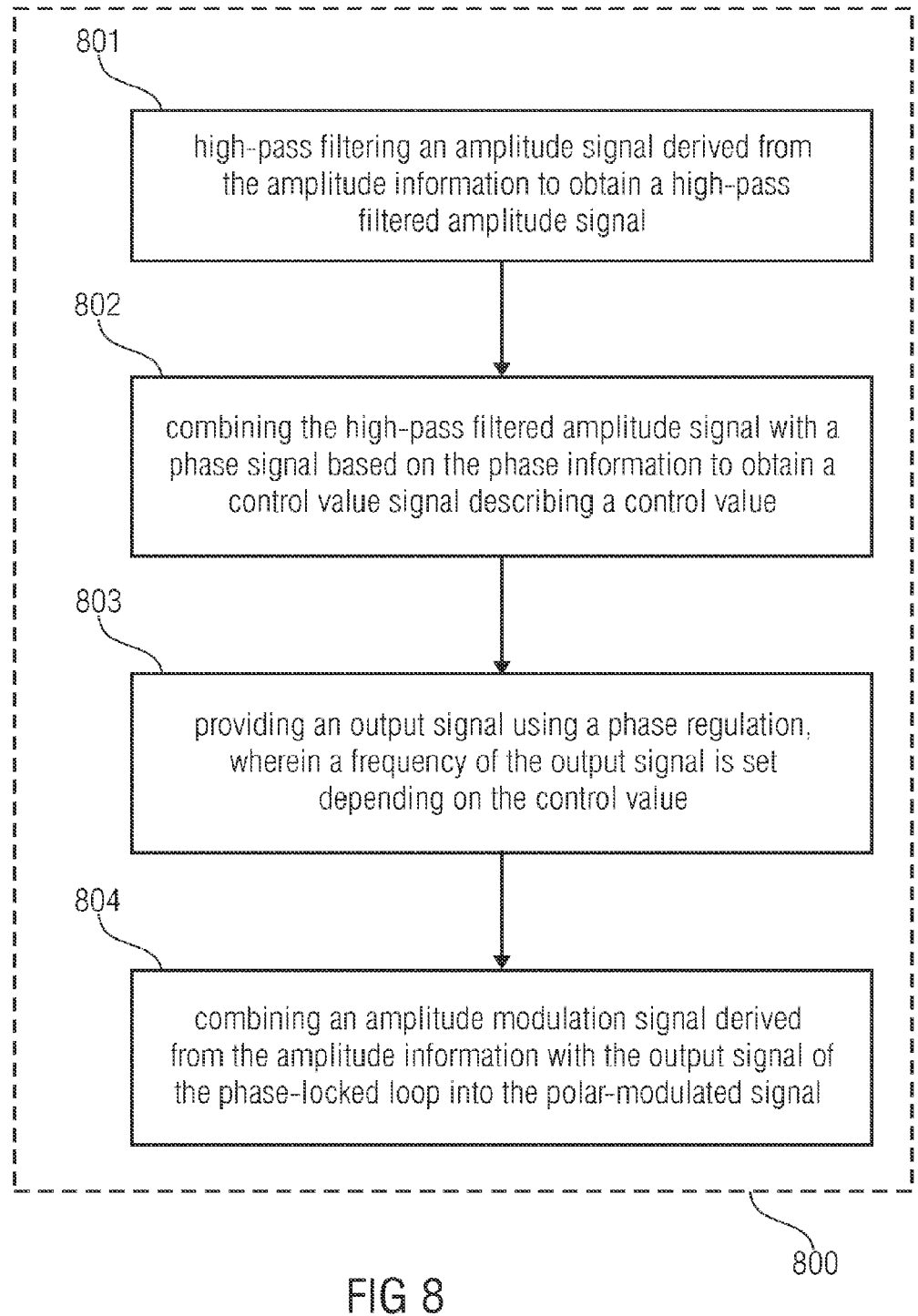
FIG. 8 shows a flowchart of a method for generating a polar modulated signal according to an embodiment of the invention.

FIG. 8 shows a flowchart for the method for generating a polar-modulated signal. The method 800 includes a first step 801, a second step 802, a third step 803 and a fourth step 804. The first step 801 includes "high-pass filtering an amplitude signal derived from the amplitude information to obtain a high-pass filtered amplitude signal". The second step 802 includes "combining the high-pass filtered amplitude signal with a phase signal based on the phase information to obtain a control value signal describing a control value". The third step 803 includes "providing an output signal using a phase regulation, wherein a frequency of the output signal is set depending on the control value (803)". The fourth step 804 includes "combining an amplitude modulation signal derived from the amplitude information with the output signal of the phase-locked loop into the polar-modulated signal".

Steps 801, 802, 803, 804 do not necessarily have to be executed consecutively; it is also possible to exchange the order of the steps.

Figure 9:
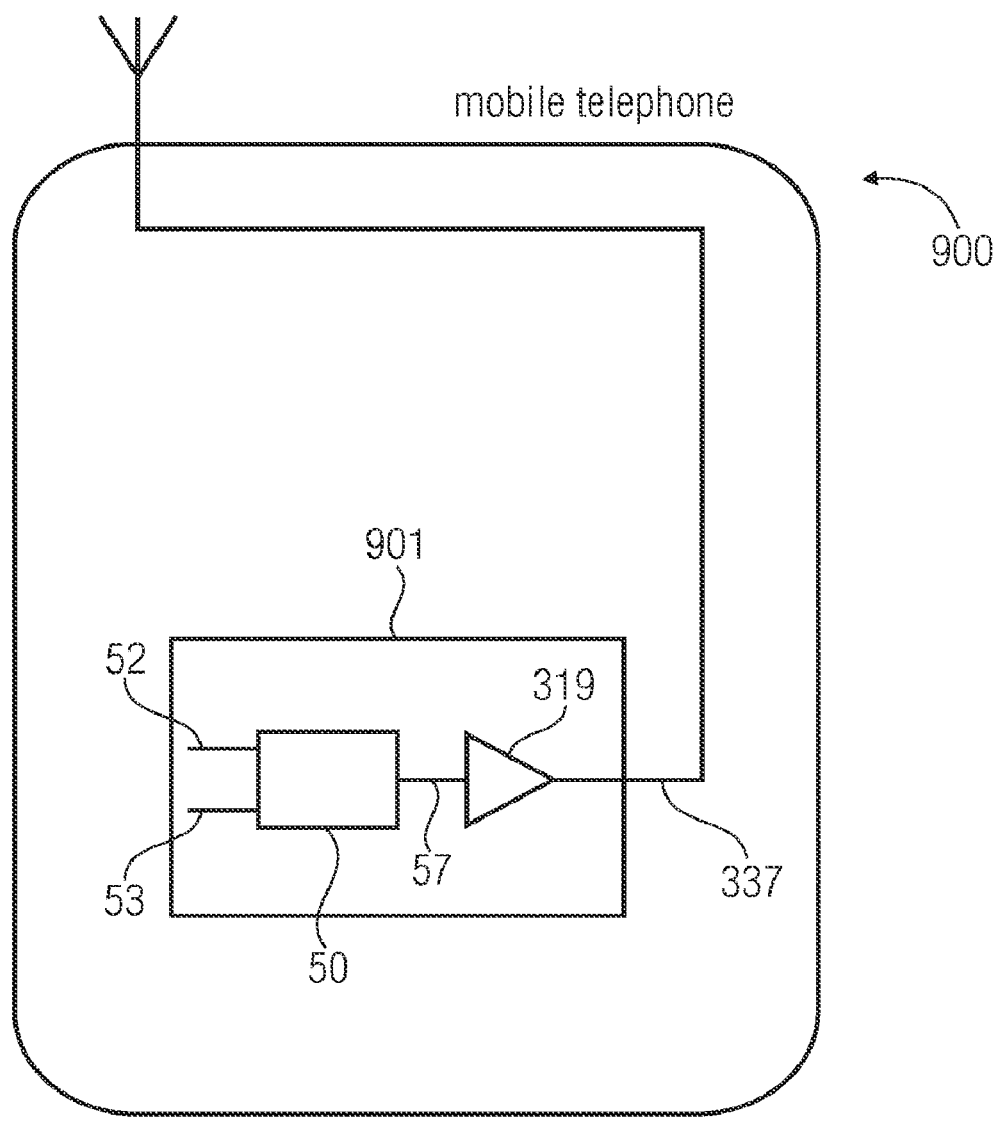
FIG. 9 shows a schematical illustration of a mobile telephone according to an embodiment of the invention.

FIG. 9 shows a schematical illustration of a mobile telephone according to an embodiment of the invention. A mobile telephone 900 includes a polar modulator 50 for generating a polar-modulated signal 57, a power amplifier 319 for amplifying the polar-modulated signal 57 and a printed circuit board 901, wherein the polar modulator 50 and the power amplifier 319 are arranged together on the printed circuit board 901. The power amplifier 319 may generate a power output signal 337 based on the polar-modulated signal 57, which is, for example, coupled to an antenna of the mobile telephone 900 to transfer the power output signal 337 to the communication partner.

According to one of the embodiments in the above-mentioned figures, the polar modulator 50 may be implemented so that the polar modulator 50 generates a polar-modulated signal from phase information 53 and amplitude information 52. The polar modulator 50 is implemented to counteract an interference effect of the power output signal 337 on the polar modulator 50 using a phase regulation.

Due to this interference compensation of the polar modulator 50, the mobile telephone 900 needs to comprise no separate shielding chambers for the polar modulator 50 and the power amplifier 319. A feedback of the power output signal 337 to the polar modulator 50 which may, for example, be moderated by the implementation of separate shielding chambers for the polar modulator 50 and the power amplifier 319, may be compensated by a phase regulation in the polar modulator 50 in the mobile telephone 900 according to this embodiment of the invention. Due to this feature of the polar modulator 50, no separate shielding chambers are needed on the printed circuit board 901. The mobile telephone 900 may be manufactured cheaper and be implemented more easily, i.e. the weight of the mobile telephone 900 may be substantially reduced.

Depending on the circumstances, the inventive method 800 may be implemented in hardware or in software. The implementation may be executed on a digital storage medium, in particular a floppy disc or a CD having electronically readable control signals which may cooperate with a programmable computer system so that the corresponding method is performed. In general, the invention thus also consists in a computer program product having a program code stored on a machine-readable carrier for executing the inventive method, when the computer program product is executed on a computer. In other words, the invention may thus also be realized as a computer program having a program code for executing the method, when the computer program is executed on a computer.

In some embodiments according to the invention, thus a cost- and time-consuming decoupling or shielding of the output signal of the power stage from the VCO may be omitted. Thus, manufacturing costs are omitted and the mobile telephone may be manufactured at a substantially lower price. For example, no separate mobile radio shielding chambers need to be accommodated on and/or be attached to, the PCB (printed circuit board) of the mobile telephone.

Embodiments according to the invention may, for example, be used in mobile telephones of the next generation which operate using EDGE modulation methods and thus achieve substantially higher data rates than when using modulation methods operating according to the known GSM standard.

Embodiments according to the invention comprise output signals of the power output stage whose spectral mask corresponds to the requirements of the EDGE standard, i.e. whose power spectrum lies within the predetermined tolerance range. The power spectrum of the output signal of the power output stage is in some embodiments symmetrical and shows interference signal couplings only with a substantially lower signal power than it is the case with conventional polar modulator output signal spectrums having EDGE-modulated signals.

Due to the improved signal power and interference power gap, in some embodiments according to the invention, the mobile telephone may, for example, transmit with a lower signal power, so that the accumulator for example lasts longer, i.e. the air times and/or conversation times may be approximated to the standby times. Further, the possibility exists that in embodiments according to the invention more mobile telephones may be located within one cell, or that the cell size is increased, i.e. that less base stations are needed for receiving the mobile telephone signal. All above-mentioned characteristics may lead to a cost reduction.

I.e., accumulator costs of the mobile telephone are reduced, hardware costs of the mobile telephone for conventionally needed shielding measures are reduced and/or costs for setting up essential base stations are reduced.

In the following, further embodiments are described and further optional features are explained.

Embodiments according to the invention relate to the compensation of an unwanted amplitude-to-frequency conversion in a polar transmitter architecture which uses a pre-distortion modulation PLL or a pre-distortion modulation phase-locked loop, respectively.

Embodiments according to the invention may be utilized in the cellular telephone market and/or in the mobile telephone market, in particular for the design of power-efficient RF transmission architectures (RF=radio frequency). The design of such power-efficient transmitters has become an important criterion for portable devices, and/or for portable devices which may be hand-held. Embodiments according to the invention may be used in digital cellular telephone systems, for example in mobile telephones operating according to the GSM standard or the GSM-EDGE standard, respectively. Embodiments according to the invention may also be used where modulation types are used which operate with non-constant envelopes to achieve higher data rates. Embodiments according to the invention in some cases enable similar conversation and standby times for the GSM standard of the next generation. Embodiments according to the invention may also be used where the signal path may, for example, be not completely linear. In embodiments according to the invention, for example no separation of the transmission path from the amplifier path of the power amplifier needs to be requested on the printed circuit board (PCB) of the mobile telephone. In embodiments according to the invention, a parasitic coupling of the output signal into the VCO may be suppressed or prevented, respectively, without requiring a separation of the transmitter from the power amplifier.

Embodiments according to the invention operate with a polar modulator concept. The polar modulator concept separates the modulation signal into an amplitude modulation (AM) signal and a phase modulation (PM) signal. In embodiments according to the invention, operation may be executed by means of Cartesian coordinates, i.e. a real portion and a quadrature portion, and also (for example as an alternative) polar coordinates, i.e. a phase portion and an amplitude portion. In embodiments according to the invention, both coordinate systems may be transformed into each other. The PM signal is e.g. directly fed into the PLL and/or phase-locked loop whose output here represents and/or provides the phase-modulated carrier signal. The AM signal may be combined in an output stage.

There are different methods of combining the PM signal and the AM signal and/or the PM information and the AM information. For example, the output stage may comprise a linear mixer. The AM signal may alternatively also be upmodulated onto the voltage supply of the output driver stage. The output stage may execute a pulse-width modulation in order, for example, to generate different amplitude values of the fundamental oscillation depending on the pulse width. A further method is, for example, the supply voltage modulation of the output driver stage or also directly of the power amplifier stage. These methods achieve a very high power efficiency.

Embodiments according to the invention show a special robustness with regard to parasitic couplings of the power amplifier output signal into the VCO and thus, for example, need no shielding chambers between the power amplifier (PA) and the transmitter on the printed circuit board (PCB) of the mobile telephone. Embodiments according to the invention suppress the coupling of the output signal into the VCO and thus the generation of an unwanted AM/FM conversion signal and thus counteract a significant deterioration of the modulation spectrum and/or an increase of the error vector quantity. Embodiments according to the invention include a polar modulator transmitter architecture having a pre-distortion modulation PLL with a fractional division factor N.

In some embodiments according to the invention, the asymmetric frequency spectrum of a conventional polar modulator which comprises no AM compensation path may be "transformed" into a symmetrical frequency spectrum which keeps to the GSM-EDGE spectral modulation mask. The overlay in the spectrum of the AM/FM-converted component with the desired AM signal component may be influenced in embodiments according to the invention in such a way that the frequency spectrum of the output signal resulting from the overlay only comprises the desired AM signal component and that the AM/FM-converted component in the frequency spectrum of the output signal is suppressed or at least reduced. Embodiments according to the invention provide a possibility to compensate this parasitic AM/FM component. The effort for a most demanding shielding and decoupling of the output signal from the VCO may be saved in embodiments according to the invention. Further, no separate RF shielding chambers need to be used on the printed circuit board of the mobile telephone.

Embodiments according to the invention describe a method of compensating parasitic AM/FM conversions based on parasitic couplings of the carrier signal into the VCO. The coupling of the carrier signal into the VCO causes a frequency modulation of the VCO by the AM signal. This may be expressed mathematically by the following equation:

$$f_{VCO}(t)=f_{01}+K_2\alpha_1 r(t-\tau),$$

wherein $K_2$ describes the VCO sensitivity factor in MHz/V, $r(t-\tau)$ describes the AM signal component and $\alpha_1$ the amplification factor considering the amplification of the (parasitic) coupling path. The time offset value or time delay value $\tau$, respectively, considers the delay of the coupling path into the VCO. The VCO sensitivity factor $K_2$ depends on the coupling input of the RF carrier signal or from a path of the parasitic coupling, respectively. For the case of coupling onto the setting input, the sensitivity factor is identical to the setting sensitivity factor $K_1$ of the VCO. The PM component causes a shift of the nominal oscillator frequency $f_0$ which is considered by the new free-running oscillator frequency $f_{01}$. The oscillator output signal may be rewritten into:

$$s_{VCO}(t)=\cos(\omega t+\phi(t))=\cos(2\omega f_{01}t+2\pi K_2\cdot\pi_1\cdot r(t-\tau)\cdot t)$$

The feedback mechanism of the phase-locked loop, or the PLL, is able to compensate frequency components within the loop bandwidth. Frequency components which are higher than the loop bandwidth may not be suppressed by the PLL, however, as the loop is not able to follow rapid frequency changes of the VCO. Thus, the transmission function characteristic of the AM signal shows a high-pass characteristic with regard to the output. The high-pass characteristic of the two transmission functions $H_{32}(j\omega)=\phi_3(\omega)/\phi_2(\omega)$ from the input 2 of the VCO to the output 3 of the VCO is qualitatively indicated in FIG. 3b. FIG. 3b shows a pre-distortion modulation of a PLL with a fractional division ratio N. In the case of an optimum cancellation of the parasitic AM signal component portion $\alpha_1 r(t-\tau)$, the output frequency of the VCO output signal is given by:

$$f_{VCO}(t)=f_{01}+K_2\cdot\alpha_1 r(t-\tau)-\tilde{K}_2\tilde{\alpha}_1\tilde{r}(t-\tau)\approx f_{01}.$$

$\tilde{K}_2$ and $\tilde{\alpha}_1\tilde{r}(t-\tau)$ represent estimates of the VCO sensitivity factor $K_2$ or, respectively, the AM signal component.

Although the AM signal r(t) is exactly known, the amplification $\alpha_1$ and the carrier phase offset $\phi=\omega_0\tau$ may only be estimated due to the unknown RF coupling path. In this respect, a settable amplification block $G=\hat{a}_1$ and a settable time delay are introduced into the AM compensation path. The time delay estimate $\hat{\tau}$ may be controlled very precisely in a range of a few nanoseconds to be able to compensate the carrier phase offset $\phi=\omega_0\cdot\tau$ of the parasitic RF coupling path.

FIG. 5a shows a generic block diagram according to an embodiment of the present invention to compensate the unwanted AM/FM-converted modulation. The pre-distortion modulation PLL is, for example, used in systems according to some embodiments of the invention, in which the modulation bandwidth is not much higher than the PLL bandwidth, for example in GSM or GSM-EDGE systems. The PM signal is converted into an FM signal and filtered by a digital pre-distortion filter to compensate the low-pass transmission function of the PLL loop filter. The resulting transmission function shows a flat frequency characteristic and a constant group delay time within the signal bandwidth. The AM signal is combined in the mixer output stage, but may also be supplied directly to the power amplifier, for example by using a supply voltage modulation.

A basic idea of some embodiments according to the invention is the compensation of the parasitic AM/FM component by the addition of the AM signal to the PM input. In this case, the signal varying the division ratio of the multi-modulus divider or multi-divider factor divider 112, respectively, includes the PM signal and the AM compensation signal. To obtain the same high-pass characteristic as the parasitic AM/FM component, the AM compensation signal may, for example, be filtered with a suitable pre-distortion filter $h_{2pre}$, as indicated in FIG. 5a or 5b, respectively. The resulting transmission function, for example AM compensation signal-to-VCO output signal should be identical to the high-pass transmission function of the unwanted AM/FM signal. FIG. 5c shows a simplified signal flow of the AM compensation path.

A central aspect of some embodiments according to the invention is a method for compensating parasitic AM/FM conversions in polar modulator transmitter architectures in connection with a pre-distortion modulation PLL with a fractional division ratio N, wherein the PLL is used for phase modulation. Embodiments of the present invention may further include digital phase-locked loops (DPLL) having digitally controlled oscillators (DCO). In such embodiments, the oscillator may, for example, be set by a digital input which controls a bank of capacitors. The DCO may be modulated digitally without requiring a digital/analog converter.

Embodiments according to the invention may be used for the GSM-EDGE standard. For example, the VCO may operate using frequencies in a range of 3.8 GHz. In the case of GSM 850/900, the divider may comprise a division factor of 4 at the output of the VCO, wherein with GSM 1800/1900 the divider may comprise a division ratio of 2. The AM compensation path may comprise a programmable amplification, a delay block and a pre-distortion filter $h_{2pre}$. The complete AM compensation pre-distortion filter may here include the filter of the AM path and further use the filter of the PM path. The complete AM path compensation filter transmission function is, for example, given by:

$$H_{AM,com}(z)=H_{2pre}(1-z^{-1})H_{1pre}$$

Embodiments according to the invention comprise a low effort for developing and/or designing the pre-distortion filter $h_{2pre}$. Here, many possibilities exist for combining the AM path and the existing PM path. The amplification block may, for example, be realized by a multiplier or alternatively by a shift addition operation. In some embodiments, the digital time delay should be settable in a range of several nanoseconds to be able to compensate the carrier phase offset. For example, in this respect all-pass filter or poly-phase filter design methods may be used, for example guaranteeing time delays in a range of fractions of the sampling rate. FIG. 7 shows an EDGE-modulated spectrum with a perfect compensation of the parasitic AM/FM portion. The spectrum illustrates a symmetrical characteristic and fulfils the GSM modulation mask requirements in the frequency range. I.e., the spectrum according to FIG. 7 lies within the predetermined tolerance range needed by the GSM standard.

For example, a setup on the semiconductor plane is a possibility for realizing the selected transmitter architecture with AM/FM compensation circuitries. In the case of a digital PLL, the blocks for forming the compensation path may be realized completely by digital logic circuits.

Embodiments according to the invention may, for example, be applied with GSM, UMTS, Bluetooth and transmission concepts for mobile communication.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations and equivalents as fall within the true spirit and scope of the present invention.

The invention claimed is:

1. A polar modulator for generating a polar-modulated signal based on amplitude information and phase information, comprising:
   a phase-locked loop which is implemented to enable a setting of a frequency depending on a control value to acquire a phase-locked loop output signal;
   a modulator which is implemented to combine an amplitude modulation signal derived from the amplitude information with the phase-locked loop output signal to generate the polar-modulated signal; and
   a control value generator which is implemented to use a high-pass filter to filter an amplitude signal derived from the amplitude information to acquire a high-pass filtered amplitude signal, wherein the control value generator is further implemented to combine the high-pass filtered amplitude signal with a phase signal based on the phase information to generate a control value signal representing the control value.

2. The polar modulator according to claim 1, wherein the control value generator is implemented to generate the high-pass filtered amplitude signal such that the control value counteracts an interference effect on the phase-locked loop.

3. The polar modulator according to claim 2, wherein the interference effect on the phase-locked loop corresponds to a parasitic AM/FM coupling of the polar-modulated signal or a signal derived from the same into the phase-locked loop.

4. The polar modulator according to claim 1, wherein the control value generator is implemented to at least partially compensate a low-pass transmission function of the phase-locked loop using the high-pass filter.

5. The polar modulator according to claim 1, wherein the control value generator is implemented to generate a partial component of the control value independent of the phase information and combine the same linearly with a partial component of the control value depending on the phase information.

6. The polar modulator according to claim 1, wherein the high-pass filter is implemented to filter the amplitude signal using settable high-pass filter coefficients.

7. The polar modulator according to claim 1, the control value generator further comprising:
   an AM compensation path that comprises an amplification, a delay and the high-pass filter, wherein the AM compensation path is implemented to amplify the amplitude signal derived from the amplitude information using the amplification, delay the amplitude signal using the delay, and filter the amplitude signal using the high-pass filter to generate the high-pass filtered amplitude signal.

8. The polar modulator according to claim 1, the control value generator comprising a differentiator that is implemented to differentiate the phase signal based on the phase information to acquire a frequency signal or to differentiate a combined signal based on a combination of the high-pass filtered amplitude signal and the phase signal based on the phase information, to acquire a combined frequency signal.

9. The polar modulator according to claim 8, the control value generator further comprising a pre-distortion filter that is implemented to pre-distort the frequency signal to acquire a pre-distorted frequency signal,
   wherein the control value generator is implemented to combine the pre-distorted frequency signal with the high-pass filtered amplitude signal to generate the control value signal; or
   wherein the pre-distortion filter is implemented to pre-distort the combined frequency signal to generate the control value signal.

10. The polar modulator according to claim 1, the control value generator comprising a sigma/delta converter that is implemented to sigma/delta-convert the control value signal to generate the control value.

11. The polar modulator according to claim 1, the polar modulator further comprising an AM path filter that includes a first delay member, an oversampler, a second delay member, a D/A converter, and a smoothing filter, wherein the AM path filter is implemented to delay the amplitude signal derived from the amplitude information using the first delay member, oversample the amplitude signal using the oversampler, delay the amplitude signal using the second delay member, digital/analog-convert the amplitude signal using the D/A converter, and smooth the amplitude signal using the smoothing filter to generate the amplitude modulation signal derived from the amplitude information.

12. The polar modulator according to claim 1, wherein the phase-locked loop is implemented as an analog phase-locked loop including a frequency divider with a settable division factor, wherein the frequency divider is implemented to set the division factor depending on the control value.

13. The polar modulator according to claim 1, wherein the phase-locked loop is implemented as a digital phase-locked loop including a frequency divider comprising a settable division factor, wherein the frequency divider is implemented to set the division factor depending on the control value.

14. The polar modulator according to claim 13, wherein the digital phase-locked loop includes at least one digitally controlled oscillator that comprises a plurality of switchable capacitors to enable a frequency setting with regard to the phase-locked loop output signal.

15. The polar modulator according to claim 1, wherein the phase-locked loop is implemented to set a frequency of approximately 3.8 GHz, and wherein the phase-locked loop further comprises a frequency divider with a division factor independent of the control value, the division factor comprising a value of 2 or 4.

16. The polar modulator according to claim 1, wherein the amplitude signal derived from the amplitude information is an amplitude signal generated using a non-linear function from a signal based on the amplitude information;
  wherein the non-linear function corresponds to a Taylor series or a power series; or
  wherein the amplitude signal derived from the amplitude information is a signal based on the amplitude information amplified by a linear factor.

17. A mobile telephone, comprising:
  a polar modulator for generating a polar-modulated signal based on amplitude information and phase information, comprising:
    a phase-locked loop which is implemented to enable a setting of a frequency depending on a control value to acquire a phase-locked loop output signal;
    a modulator which is implemented to combine an amplitude modulation signal derived from the amplitude information with the phase-locked loop output signal to generate the polar-modulated signal; and
    a control value generator which is implemented to use a high-pass filter to filter an amplitude signal derived from the amplitude information to acquire a high-pass filtered amplitude signal, wherein the control value generator is further implemented to combine the high-pass filtered amplitude signal with a phase signal based on the phase information to generate a control value signal representing the control value, for generating the polar-modulated signal; and
  a power amplifier which is implemented to amplify the polar-modulated signal wherein the polar modulator and the power amplifier are arranged such that a feedback exists from the power amplifier to the phase-locked loop.

18. The mobile telephone according to claim 17,
  wherein the polar modulator and the power amplifier together are arranged on a common printed circuit board.

19. The mobile telephone according to claim 17, wherein the feedback follows a feedback path from the power amplifier to the phase-locked loop, and wherein the feedback path comprises an unshielded electric coupling.

20. A method for generating a polar-modulated signal based on amplitude information and phase information, the method comprising:
  high-pass filtering an amplitude signal derived from the amplitude information to acquire a high-pass filtered amplitude signal;
  combining the high-pass filtered amplitude signal with a phase signal based on the phase information to acquire a control value signal describing a control value;
  providing an output signal of a phase-locked loop using phase regulation, wherein a frequency of the output signal is set depending on the control value; and
  combining an amplitude modulation signal derived from the amplitude information with the output signal of the phase-locked loop into the polar-modulated signal.

21. A computer program comprising a program code for executing the method for generating a polar-modulated signal based on amplitude information and phase information, the method comprising:
  high-pass filtering an amplitude signal derived from the amplitude information to acquire a high-pass filtered amplitude signal;
  combining the high-pass filtered amplitude signal with a phase signal on the phase information to acquire a control value signal describing a control value;
  providing an output signal of a phase-locked loop using phase regulation, wherein a frequency of the output signal is set depending on the control value; and
  combining an amplitude modulation signal derived from the amplitude information with the output signal of the phase-locked loop into the polar-modulated signal, when the computer program is executed on a computer.

22. A polar modulator for generating a polar-modulated signal based on amplitude information and phase information, comprising:
  a phase-locked loop which is implemented to enable a setting of a frequency depending on a control value to obtain a phase-locked loop output signal;
  a modulator which is implemented to combine an amplitude modulation signal derived from the amplitude information with the phase-locked loop output signal to generate the polar-modulated signal; and
  a control value generator which is implemented to generate the control value based on the amplitude information and the phase information, wherein the control value generator is further implemented to additively overlay a first signal value and a second signal value to generate the control value, the first signal value derived from high-pass filtering the amplitude information, and the second signal value corresponding to the phase information or derived from the phase information.

23. The polar modulator according to claim 22, wherein the control value generator is further implemented to generate the first signal value derived from the amplitude information such that the control value counteracts an interference effect on the phase-locked loop.

24. The polar modulator according to claim 23, wherein the interference effect on the phase-locked loop corresponds to a parasitic amplitude modulation/frequency modulation coupling of the polar-modulated signal or a signal derived from the same.

25. A polar modulator for generating a polar-modulated signal based on amplitude information and phase information, comprising:
  a phase-locked loop which is implemented to enable the setting of a frequency depending on a control value to acquire a phase-locked loop output signal;
  a modulator which is implemented to combine an amplitude modulation signal derived from the amplitude information with the phase-locked loop output signal to generate the polar-modulated signal; and
  a control value generator,
  wherein the control value generator comprises an amplification, a delay and a high-pass filter;
  wherein the control value generator is implemented to amplify an amplitude signal derived from the amplitude information using the amplification, delay the same using the delay and high-pass filter the same using the high-pass filter to determine a high-pass filtered amplitude signal from the amplitude signal derived from the amplitude information;
  wherein the control value generator further comprises a differentiator and a pre-distortion filter;
  wherein the control value generator is further implemented to differentiate a phase signal based on the phase information using the differentiator and pre-distort the same using the pre-distortion filter to acquire a pre-distorted frequency signal from the phase signal based on the phase information to additively overlay the pre-distorted frequency signal with the high-pass filtered amplitude signal to generate a control value signal representing the control value; or wherein the control value generator is further implemented to additively overlay a phase signal based on the phase information with the high-pass filtered amplitude signal to generate a combined signal to differentiate the combined signal using the differentiator and pre-distort the same using the pre-distortion filter, to generate a control value signal from the combined signal representing the control value.

26. A polar modulation means for generating a polar-modulated signal based on amplitude information and phase information, comprising:
a means for high-pass filtering an amplitude signal derived from the amplitude information to acquire a high-pass filtered amplitude signal;
a means for combining the high-pass filtered amplitude signal with a phase signal based on the phase information to acquire a control value signal describing a control value;
a means for providing an output signal of a phase-locked loop using phase regulation, wherein a frequency of the output signal is set depending on the control value; and
a means for combining an amplitude modulation signal derived from the amplitude information with the output signal of the phase-locked loop into the polar-modulated signal.

* * * * *